United States Patent
Chang (10) Patent No.: US 9,019,241 B2
(45) Date of Patent: Apr. 28, 2015

(54) METHOD AND SYSTEM FOR GENERATING CALIBRATION INFORMATION FOR AN OPTICAL IMAGING TOUCH DISPLAY DEVICE

(75) Inventor: Hsun-Hao Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 101 days.

(21) Appl. No.: 13/308,919

(22) Filed: Dec. 1, 2011

(65) Prior Publication Data

US 2012/0206410 A1 Aug. 16, 2012

(30) Foreign Application Priority Data

Feb. 15, 2011 (TW) .............................. 100104943 A (51) Int. Cl.
*G06F 3/042* (2006.01)
*G06F 3/041* (2006.01)

(52) U.S. Cl.
CPC ............ *G06F 3/0418* (2013.01); *G06F 3/0421* (2013.01)

(58) Field of Classification Search
USPC ........ 345/173–178; 178/18.01; 382/132, 149, 382/164, 173, 199
See application file for complete search history.

(56) References Cited

U.S. PATENT DOCUMENTS

| 5,444,552 | A | * | 8/1995 | Smith, III | 358/465 |
|---|---|---|---|---|---|
| 6,094,508 | A | * | 7/2000 | Acharya et al. | 382/199 |
| 6,169,550 | B1 | | 1/2001 | Jain | |
| 6,803,906 | B1 | * | 10/2004 | Morrison et al. | 345/173 |
| 7,599,520 | B2 | * | 10/2009 | Dempski et al. | 382/103 |
| 7,720,270 | B2 | * | 5/2010 | Li et al. | 382/131 |
| 7,948,479 | B2 | * | 5/2011 | Liu et al. | 345/173 |
| 8,269,749 | B2 | | 9/2012 | Lin et al. | |
| 8,289,299 | B2 | * | 10/2012 | Newton | 345/175 |
| 8,294,693 | B2 | * | 10/2012 | Walberg et al. | 345/175 |

(Continued)

FOREIGN PATENT DOCUMENTS

| CN | 101882028 A | 10/2010 |
|---|---|---|
| CN | 101882028 | 11/2010 |

(Continued)

OTHER PUBLICATIONS

Office Action issued in corresponding Taiwanese application No. 100104943 dated Dec. 27, 2013.

(Continued)

*Primary Examiner* — Kumar Patel
*Assistant Examiner* — Amy C Onyekaba
(74) *Attorney, Agent, or Firm* — Renner, Otto, Boisselle & Sklar, LLP.

(57) ABSTRACT

A system for generating calibration information for an optical imaging touch display device includes a calibration tool and a processor. The calibration tool is disposed within an image capturing range of an image capturing unit, and has a surface with mark patterns. Each adjacent pair of the mark patterns defines a pattern boundary. The calibration tool is disposed such that the pattern boundary forms a predefined positional relationship with a corresponding predefined location on the optical imaging touch display device. The processor receives an image frame corresponding to an image of the surface of the calibration tool, performs edge detection on the image frame to determine a position of each of at least one detected pattern edge, and generates the calibration information with reference to the position thus determined and the corresponding predefined location.

9 Claims, 7 Drawing Sheets

(56) References Cited

U.S. PATENT DOCUMENTS

| | | |
|---|---|---|
| 8,368,668 B2 | 2/2013 | Lin et al. |
| 8,401,304 B2 * | 3/2013 | Cavallaro et al. ............. 382/199 |
| 8,462,137 B2 | 6/2013 | Lin et al. |
| 2003/0043116 A1 * | 3/2003 | Morrison et al. ............. 345/158 |
| 2003/0063277 A1 * | 4/2003 | Kennedy et al. ............. 356/400 |
| 2003/0228050 A1 * | 12/2003 | Geshel et al. ................. 382/149 |
| 2004/0081355 A1 * | 4/2004 | Takahashi ..................... 382/165 |
| 2006/0022962 A1 * | 2/2006 | Morrison et al. ............. 345/175 |
| 2006/0202974 A1 * | 9/2006 | Thielman ...................... 345/175 |
| 2008/0069421 A1 * | 3/2008 | Abramov et al. ............. 382/132 |
| 2008/0100709 A1 * | 5/2008 | Furukawa ..................... 348/169 |
| 2008/0152220 A1 * | 6/2008 | Shi et al. ...................... 382/164 |
| 2008/0203335 A1 * | 8/2008 | Ehrhardt et al. ......... 250/559.36 |
| 2009/0058833 A1 * | 3/2009 | Newton ......................... 345/175 |
| 2009/0080773 A1 * | 3/2009 | Shaw et al. ................... 382/173 |
| 2009/0135162 A1 * | 5/2009 | Van De Wijdeven et al. 345/175 |
| 2009/0195500 A1 * | 8/2009 | Huang et al. ................. 345/157 |
| 2009/0219256 A1 * | 9/2009 | Newton ......................... 345/173 |
| 2009/0295711 A1 * | 12/2009 | Nakamura et al. ............ 345/156 |
| 2010/0079412 A1 | 4/2010 | Chiang |
| 2010/0103143 A1 * | 4/2010 | Newton et al. ................ 345/175 |
| 2010/0201639 A1 * | 8/2010 | Huang et al. .................. 345/173 |
| 2010/0207911 A1 * | 8/2010 | Newton ......................... 345/175 |
| 2010/0303361 A1 * | 12/2010 | Mitsui ........................... 382/199 |
| 2010/0328270 A1 * | 12/2010 | Lin et al. ....................... 345/175 |
| 2011/0050649 A1 * | 3/2011 | Newton et al. ................ 345/175 |
| 2011/0102375 A1 * | 5/2011 | Liu et al. ....................... 345/175 |
| 2011/0199335 A1 * | 8/2011 | Li et al. ......................... 345/175 |
| 2012/0038591 A1 * | 2/2012 | Chen et al. .................... 345/175 |
| 2012/0141015 A1 * | 6/2012 | Yu et al. ........................ 382/154 |
| 2012/0308919 A1 * | 12/2012 | Chen et al. ........................ 430/5 |

FOREIGN PATENT DOCUMENTS

| | | | |
|---|---|---|---|
| CN | 101882028 A * | 11/2010 | ............. G06F 3/042 |
| TW | 201101143 A | 1/2011 | |

OTHER PUBLICATIONS

Office Action issued in corresponding Chinese patent application No. 201110052450.1 dated May 20, 2014.

Xue, Lee; Master's Thesis, "Performance Evaluation in Edge Detection Algorithms of Gray Images", Sehnyang University of Technology, published Mar. 9, 2007.

* cited by examiner

METHOD AND SYSTEM FOR GENERATING CALIBRATION INFORMATION FOR AN OPTICAL IMAGING TOUCH DISPLAY DEVICE

CROSS-REFERENCE TO RELATED APPLICATION

This application claims priority of Taiwanese Application No. 100104943, filed on Feb. 15, 2011, the disclosure of which is incorporated herein by reference.

BACKGROUND OF THE INVENTION

1. Field of the Invention

The invention relates to optical touch display technology, more particularly to a method and a system for generating calibration information for an optical imaging touch display device.

2. Description of the Related Art

A conventional optical imaging touch display device generally includes at least two light-sensing elements and performs computation upon light signals detected by the light-sensing elements to obtain coordinates of a touch point on a display panel of the optical imaging touch display device during a touch event. However, if there exist some offsets in the light signals as detected by the light-sensing elements, accuracy of the coordinate determination of the touch point would be adversely affected.

As disclosed in Taiwanese Patent Publication No. 201015507, in a conventional calibration technology for an optical imaging touch display device, multiple testing points with predefined coordinates are displayed on the display panel of the optical imaging touch display device for a user to touch using a stylus (e.g., finger) while touch detections are performed with the aid of at least one of the light-sensing elements to obtain detected coordinates of the touches respectively corresponding to the displayed testing points. The detected coordinates are used together with the predefined coordinates for the generation of calibration information (e.g., angular calibration function), which is subsequently used to calibrate image display on the optical imaging touch display device. However, the downside of the conventional calibration technology is that it requires the user to actually perform touch operations on the display panel in accordance with the testing points displayed thereon.

SUMMARY OF THE INVENTION

Therefore, the object of the present invention is to provide a method for generating calibration information for an optical imaging touch display device without requiring a user to actually perform a touch operation on the optical imaging touch display device.

According to one aspect of the present invention, there is provided a method for generating calibration information for an optical imaging touch display device that includes at least one image capturing unit by utilizing the image capturing unit, a processor and a calibration tool. The calibration tool has a surface that is provided with a plurality of mark patterns. Each adjacent pair of the mark patterns defines a pattern boundary therebetween. The calibration tool is disposed such that the pattern boundary between each adjacent pair of the mark patterns forms a predefined positional relationship with a corresponding predefined location on the optical imaging touch display device. The method includes the following steps:

(A) configuring the image capturing unit to capture an image of the surface of the calibration tool so as to generate an image frame;

(B) configuring the processor to perform edge detection on the image frame so as to determine a position of each of at least one detected pattern edge within the image frame; and (C) configuring the processor to generate the calibration information with reference to the position of each of said at least one detected pattern edge as determined in step (B) and the corresponding predefined location on the optical imaging touch display device.

Another object of the present invention is to provide a system for generating calibration information for an optical imaging touch display device without requiring a user to actually perform a touch operation on the optical imaging touch display device.

According to another aspect of the present invention, there is provided a system for generating calibration information for an optical imaging touch display device. The optical imaging touch display device includes a display panel and at least one image capturing unit. The system includes a calibration tool and a processor. The calibration tool is to be disposed within an image capturing range of the image capturing unit of the optical imaging touch display device, and has a surface that is provided with a plurality of mark patterns. Each adjacent pair of the mark patterns defines a pattern boundary therebetween. The calibration tool is disposed such that the pattern boundary between each adjacent pair of the mark patterns forms a predefined positional relationship with a corresponding predefined location on the optical imaging touch display device. The processor is adapted for receiving an image frame from the image capturing unit. The image frame corresponds to an image of the surface of the calibration tool as captured by the image capturing unit. The processor performs edge detection on the image frame so as to determine a position of each of at least one detected pattern edge within the image frame, and generates the calibration information with reference to the position of each of the at least one detected pattern edge thus determined and the corresponding predefined location on the optical imaging touch display device.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE PREFERRED EMBODIMENT

Figure 1:
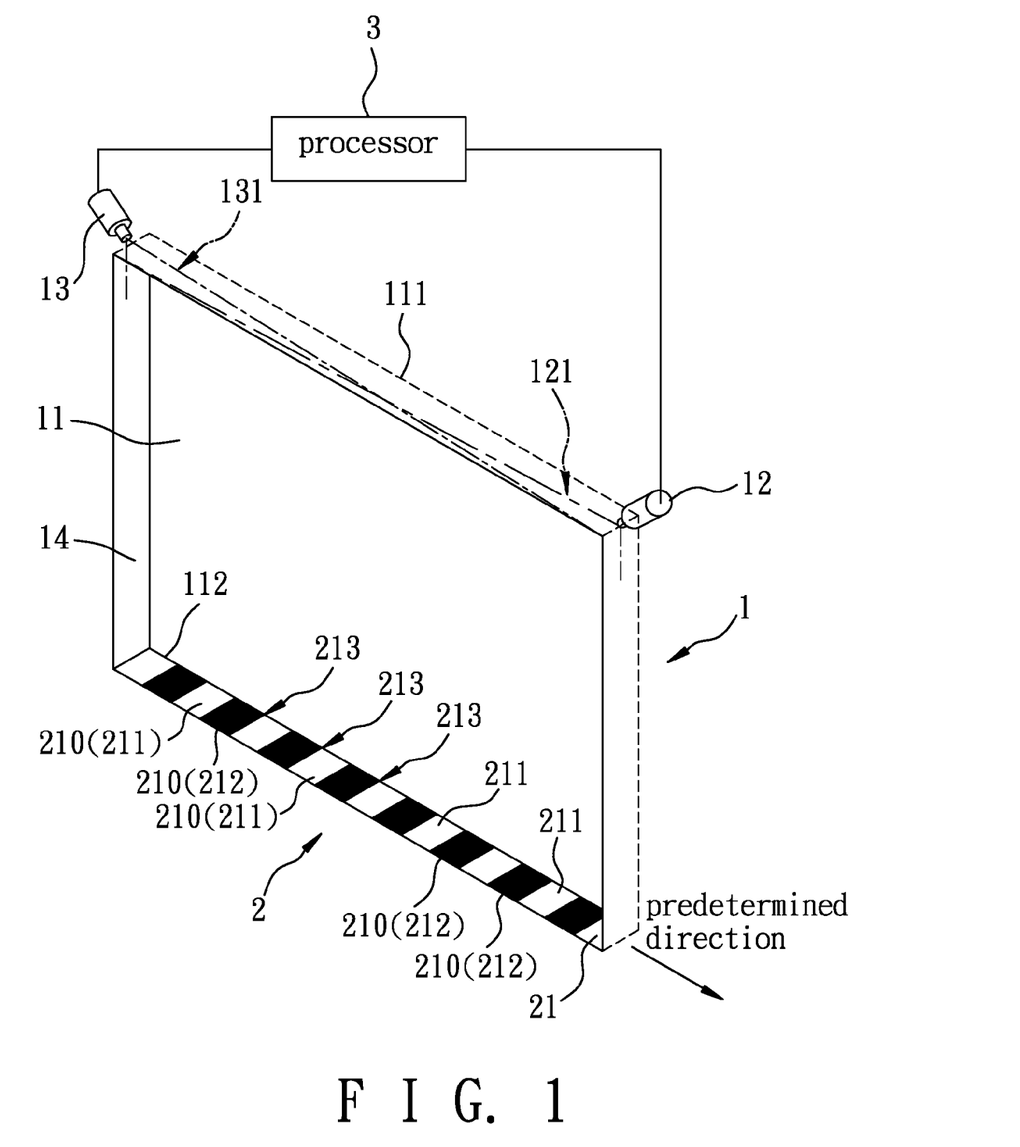
FIG. 1 is a schematic diagram, illustrating a first implementation of the embodiment of a system for generating calibration information for an optical imaging touch display device according to the present invention, where the system includes a calibration tool that is leveled with a second side of a display panel of the optical imaging touch display device opposite to a first side.
Figure 2A:
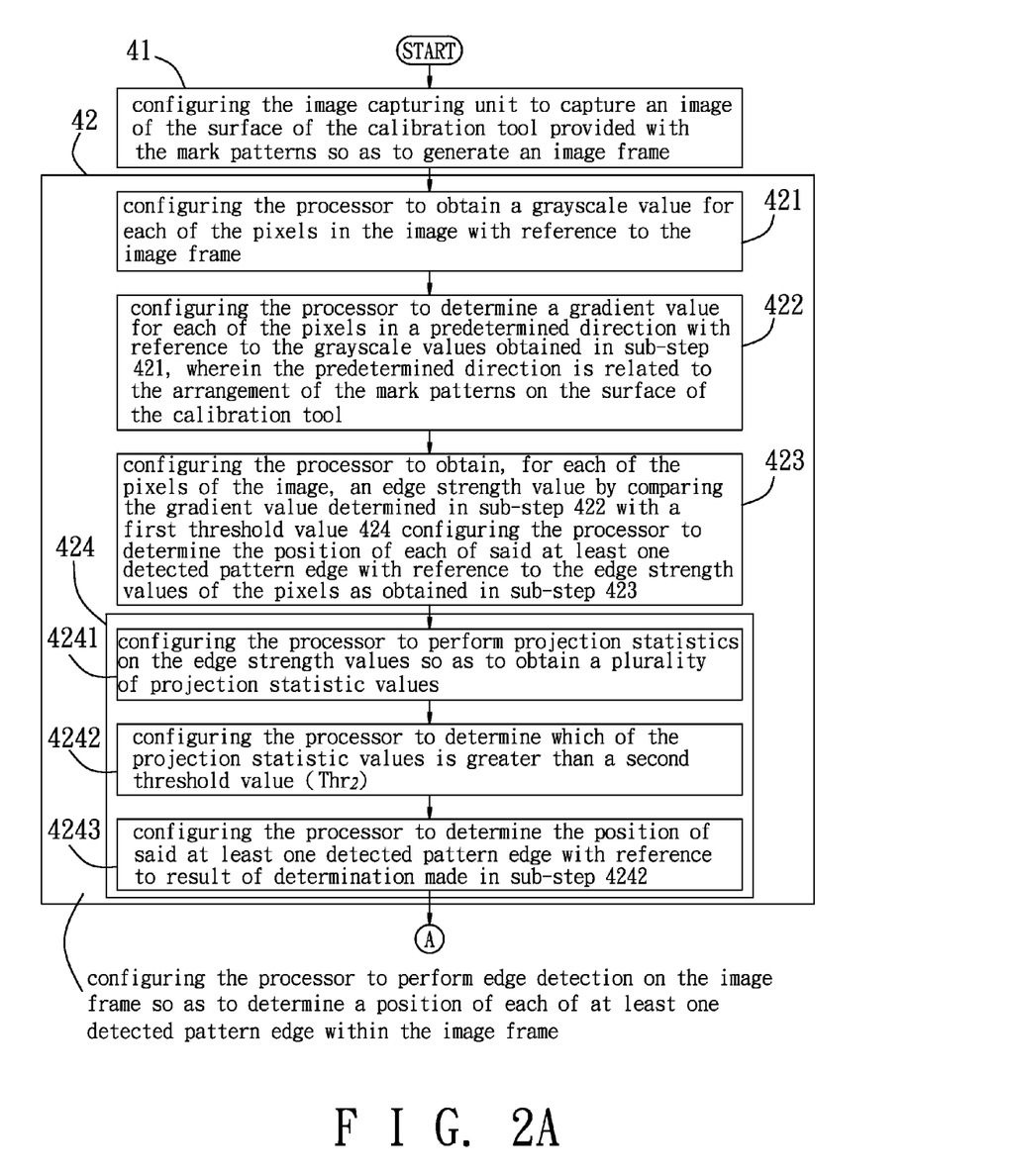
FIGS. 2A and 2B cooperatively illustrate a flow chart illustrating the embodiment of a method for generating calibration information for an optical imaging touch display device according to the present invention.
Figure 2B:
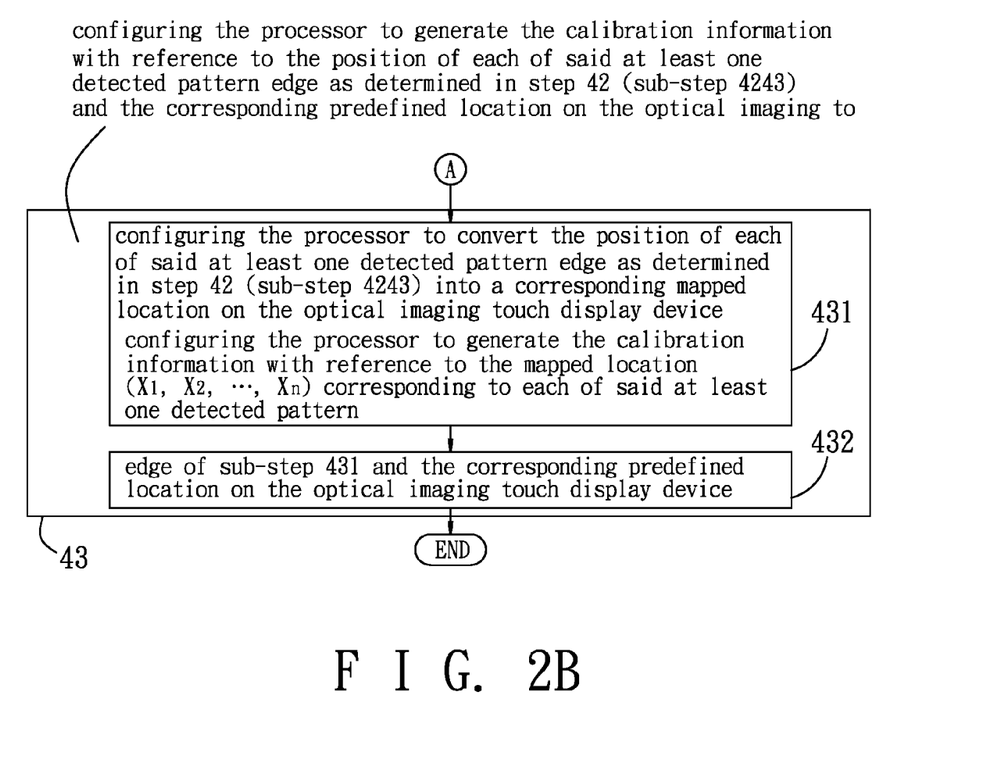

With reference to FIG. 1, a first implementation of the embodiment of a system for generating calibration information for an optical imaging touch display device according to the present invention includes a calibration tool 2 and a processor 3. The optical imaging touch display device 1 includes a display panel 11, two image capturing units 12, 13, and a hollow frame 14. The display panel 11 is disposed at a rear opening of the frame 14, and has a first side 111 and a second side 112 spaced apart from and parallel to each other. The image capturing units 12, 13 are spacedly disposed adjacent to the first side 111 of the display panel 11.

The calibration tool 2 is to be disposed within an image capturing range 121, 131 of each of the image capturing units 12, 13 of the optical imaging touch display device 1, and has a surface 21 that is provided with a plurality of mark patterns 210. Each adjacent pair of the mark patterns 210 defines a pattern boundary 213 therebetween. The calibration tool 2 is disposed such that the pattern boundary 213 between each adjacent pair of the mark patterns 210 forms a predefined positional relationship with a corresponding predefined location on the display panel 11 of the optical imaging touch display device 1.

In this embodiment, the calibration tool 2 is disposed on and leveled with a bottom side of the frame 14 adjacent to the second side 112 of the display panel 11. The mark patterns 210 are arranged on the surface 21 of the calibration tool 2 along a predetermined direction. Preferably, the predetermined direction is a linear direction. The mark patterns 210 include at least one first mark pattern 211 and at least one second mark pattern 212 different in at least one of color and texture from the first mark pattern 211 so that the first and second mark patterns 211 have distinguishable features. The first and second mark patterns 211, 212 are arranged alternatingly along the predetermined direction. In this embodiment, the first mark patterns 211 are in white in color, while the second mark patterns 212 are black in color.

At least one of the image capturing units 12, 13 captures an image of the surface 21 of the calibration tool 2 so as to generate an image frame.

The processor 3 of the system is adapted to be coupled to at least one of the image capturing units 12, 13 for receiving the image frame from said at least one of the image capturing units 12, 13. The processor 3 performs edge detection on the image frame so as to determine a position of each of at least one detected pattern edge within the image frame, and generates the calibration information with reference to the position of each of the at least one detected pattern edge thus determined and the corresponding predefined location on the display panel 11 of the optical imaging touch display device 1.

Specifically, the processor 3 obtains a grayscale value for each of a plurality of pixels in the image (see FIG. 3) received thereby from at least one of the image capturing units 12, 13, determines a gradient value for each of the pixels in a predetermined direction with reference to the grayscale values, obtains an edge strength value for each of the pixels of the image 51 by comparing the gradient value with a first threshold value, and further determines the position of each of the at least one detected pattern edge with reference to the edge strength values of the pixels thus obtained. The predetermined direction is related to an arrangement of the mark patterns 211, 212 on the surface 21 of the calibration tool 2.

The processor 3 converts the position of each of the at least one detected pattern edge into a corresponding mapped location on the optical imaging touch display device 1, and generates the calibration information with reference to the mapped location corresponding to each of the at least one detected pattern edge and the corresponding predefined location on the optical touch display device 1.

With reference to FIGS. 1 to 4, the method for generating calibration information for an optical imaging touch display device 1 according to the first implementation of the embodiment is described as follows.

Since operations of the image capturing units 12, 13 of the optical imaging touch display device 1 are similar, and since the processes such as edge detection performed by the processor 3 on each image frame are similar, the following description will be based on the image 51 captured by the image capturing unit 12 and the processes performed on that particular image 51 by the processor 3.

Initially, in step 41, the image capturing unit 12 is configured to capture an image 51 (see FIG. 3) of the surface 21 of the calibration tool 2 provided with the mark patterns 210 so as to generate an image frame. In this embodiment, the image 51 captured by the image capturing unit 12 is a color image, and the image frame includes a plurality of pixels, each having a corresponding red (R) value, a corresponding green (G) value and a corresponding blue (B) value. For the sake of illustration, the image 51 is defined in an image coordinate system (X, Y).

In step 42, the processor 3 is configured to perform edge detection on the image frame so as to determine a position of each of at least one detected pattern edge within the image frame.

Specifically, step 42 includes sub-step 421, sub-step 422, sub-step 423 and sub-step 424. In sub-step 421, the processor 3 is configured to obtain a grayscale value for each of the pixels in the image 51 with reference to the image frame. In this embodiment, the following formula (1) is used for the determination of the grayscale value for a pixel at position (x, y) in the image coordinate system (X, Y):

$$I_{gray}(x,y) = 0.299 \times I_R(x,y) + 0.587 \times I_G(x,y) + 0.114 \times I_B(x,y) \quad (1)$$

where $I_{gray}(x,y)$ represents the grayscale value for the pixel at position (x, y), $I_R(x,y)$ represents the red value for the pixel at position (x, y), $I_G(x,y)$ represents the green value for the pixel at position (x, y), and $I_B(x,y)$ represents the blue value for the pixel at position (x, y).

It should be noted herein that the image 51 captured by the image capturing unit 12 may also be a grayscale image, in which case the aforesaid computation may be omitted while the grayscale values are directly obtained from the image frame corresponding to the grayscale image as captured by the image capturing unit 12.

Figure 3:
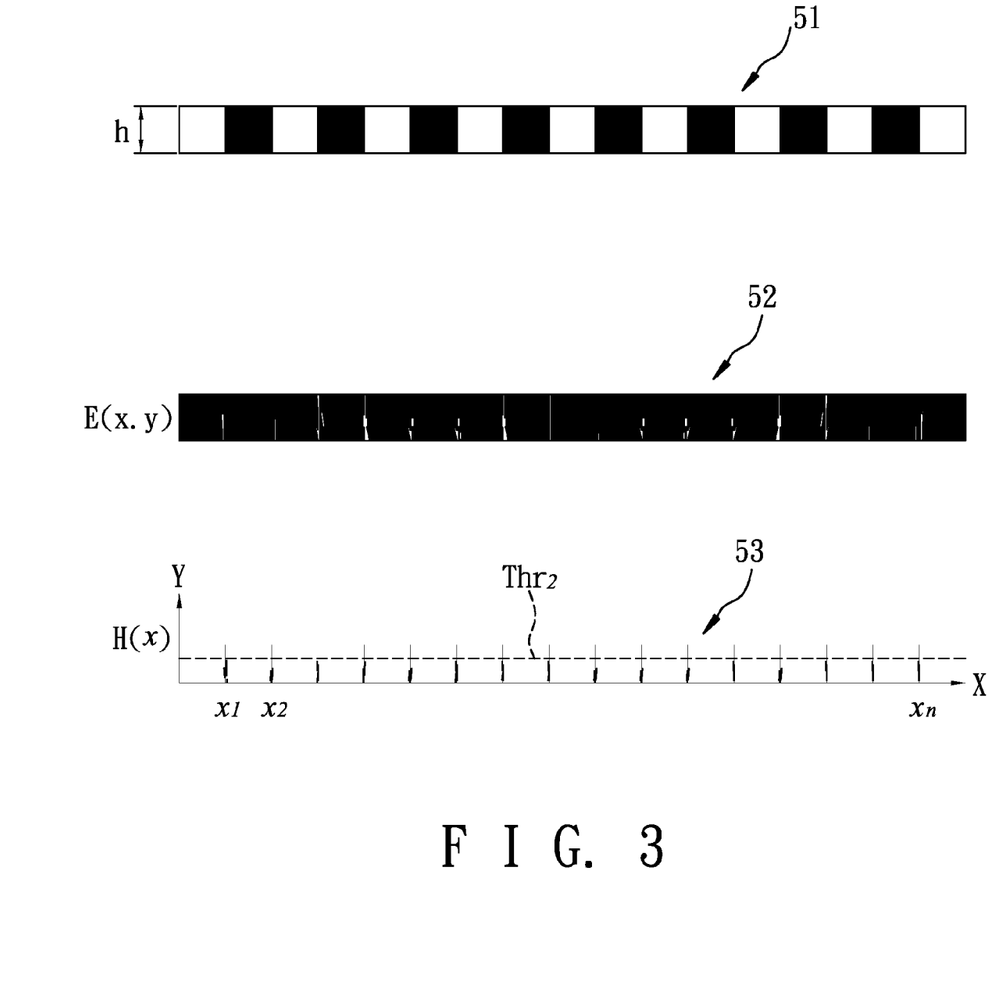
FIG. 3 is a schematic diagram illustrating an image of the calibration tool as captured by an image capturing unit of the optical imaging touch display device, a binary image formed by edge strength values of a plurality of pixels in the image, and a histogram formed by projecting the edge strength values onto a direction (X)

Moreover, due to the positional and angular relationship between the image capturing unit 12 and the calibration tool 2, it is possible for the image 51 captured by the image capturing unit 12 to be geometrically distorted (i.e., not having the rectangular shape of the calibration tool 2 as illustrated in FIG. 3, such that a geometric calibration is required. Since this technique is well known in the art, and since the feature of the present invention does not reside in geometric calibration, further details of the same are omitted herein for the sake of brevity. It is assumed in the following description that the image 51 captured by the image capturing unit 12 is geometrically undistorted in comparison with the calibration tool 2.

In sub-step 422, the processor 3 is configured to determine a gradient value for each of the pixels in a predetermined direction with reference to the grayscale values obtained in sub-step 421, wherein the predetermined direction is related to the arrangement of the mark patterns 210 on the surface 21 of the calibration tool 2. In this embodiment, the first mark patterns 211 and the second mark patterns 212 are arranged alternatingly along a predetermined linear direction, and the pattern boundary 213 defined between each adjacent pair of the first and second mark patterns 211, 212 extends perpendicularly to the predetermined linear direction. In the image 51 of the surface 21 of the calibration tool 2 as captured by the image capturing unit 12, assuming there is no geometric distortion between the image 51 and the calibration tool 2, the predetermined linear direction should extend in the direction (X) of the image coordinate system, and the pattern boundary 213 should extend in the direction (Y) of the image coordinate system. Since the image 51 captured by the image capturing unit 12 contains features of the arrangement of the first and second mark patterns 211, 212 on the surface 21 of the calibration tool 2, the processor 3 determines the gradient value for a pixel at position (x, y) in the direction (X) according to the following formula (2):

$$G_X(x,y) = |I_{gray}(x+1,y) - I_{gray}(x,y)| \qquad (2)$$

where $G_X(x,y)$ represents the gradient value for the pixel at position (x, y), $I_{gray}(x,y)$ represents the grayscale value for the pixel at position (x, y), and $I_{gray}(x+1,y)$ represents the grayscale value for the pixel at position (x+1, y).

Subsequently, in sub-step 423, the processor 3 is configured to obtain, for each of the pixels of the image 51, an edge strength value by comparing the gradient value determined in sub-step 422 with a first threshold value. In this embodiment, the edge strength value for a pixel at position (x, y) in the image 51 is determined according to the following relation (3):

$$\begin{cases} \text{if } G_x(x, y) > Thr_1, & E(x, y) = 255 \\ \text{otherwise,} & E(x, y) = 0 \end{cases} \qquad (3)$$

where E(x,y) represents the edge strength value for the pixel at position (x, y), and $Thr_1$ represents the first threshold value. Essentially, this step is equivalent to performing thresholding on the pixels of the image 51 so as to determine whether or not each of the pixels is an edge pixel, i.e., a pixel whose gradient value is greater than the first threshold value. A binary image 52 can be formed using the edge strength values of the pixels, as illustrated in FIG. 3, where pixels with E(x,y)=0 are represented by the color black, and pixels with E(x,y)=255 are represented by the color white.

In sub-step 424, the processor 3 is configured to determine the position of said at least one detected pattern edge with reference to the edge strength values of the pixels as obtained in sub-step 423. In this embodiment, sub-step 424 includes sub-step 4241, sub-step 4242 and sub-step 4243.

In sub-step 4241, the processor 3 is configured to perform projection statistics on the edge strength values so as to obtain a plurality of projection statistic values. In the example shown in FIG. 3, the projection analysis is performed in the direction (Y) according to the following formula (4):

$$H(x) = \sum_{y=1}^{h} E(x, y) \qquad (4)$$

where H(x) represents the projection statistic value obtained from pixels located at X=x in the image coordinate system (X, Y), and (h) represents the "height" of the image 51 in the direction (Y) (i.e., the number of pixels in the direction (Y) for X=x). Graphically, the projection statistic values can be used to form a histogram 53 as shown in FIG. 3.

Next, in sub-step 4242, the processor 3 is configured to determine which one(s) of the projection statistic values is greater than a second threshold value $(Thr_2)$.

In sub-step 4243, the processor 3 is configured to determine the position of said at least one detected pattern edge with reference to result of determination made in sub-step 4242. Specifically, for each projection statistic value that is greater than the second threshold value $(Thr_2)$, the corresponding position in the direction (X) of the image coordinate system (X, Y) is taken as the position of a corresponding detected pattern edge. With reference to the histogram 53 illustrated in FIG. 3, the positions of the detected pattern edges are labeled as $(x_1, x_2, \ldots, x_n)$.

Subsequently, in step 43, the processor 3 is configured to generate the calibration information with reference to the position of each of said at least one detected pattern edge as determined in step 42 (or, specifically, sub-step 4243) and the corresponding predefined location on the optical imaging touch display device 1.

In this embodiment, step 43 includes sub-step 431 and sub-step 432.

Figure 4:
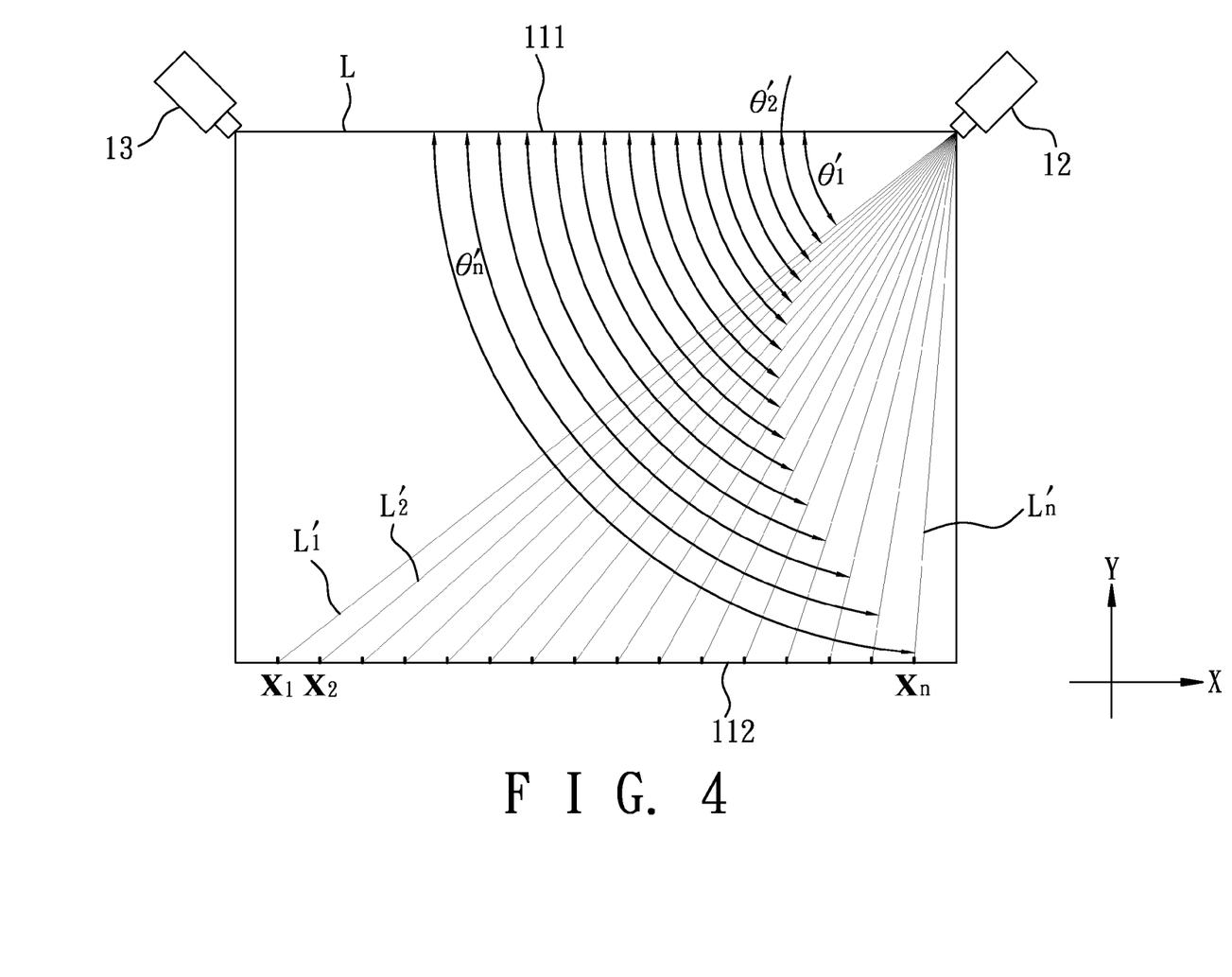
FIG. 4 is a schematic diagram, illustrating an example of a plurality of mapped locations and their relationships with the image capturing unit according to the first implementation of the embodiment.

In sub-step 431, the processor 3 is configured to convert the position of each of said at least one detected pattern edge as determined in step 42 (specifically, sub-step 4243) into a corresponding mapped location on the optical imaging touch display device 1. In detail, the position of each of said at least one detected pattern edge is defined in the image coordinate system (X,Y), and in sub-step 431, the processor 3 essentially converts the position of each of said at least one detected pattern edge into a mapped location defined in a physical coordinate system of the optical imaging touch display device 1. With reference to FIG. 4, the mapped locations of the detected pattern edges are labeled as $(X_1, X_2, \ldots, X_n)$. It should be noted herein that since the positional relationship between the calibration tool 2 and the optical imaging touch display device 1 is predefined, a conversion formulation from the position defined in the imaging coordinate system (X, Y) to the mapped location on the optical imaging touch display device 1 can be known in advance.

In sub-step 432, the processor 3 is configured to generate the calibration information with reference to the mapped location $(X_1, X_2, \ldots, X_n)$ corresponding to each of said at least one detected pattern edge of sub-step 431 and the corresponding predefined location on the optical imaging touch display device 1. Specifically, since each of the detected pattern edges within the image 51 as captured by the image capturing unit 12 should correspond to the pattern boundary 213 defined between a corresponding adjacent pair of the first and second mark patterns 211, 212, and since the pattern boundary 213 and the corresponding predefined location on the optical imaging touch display device 1 form the predefined positional relationship, the mapped location $(X_1, X_2, \ldots, X_n)$ corresponding to each of the detected pattern edges should ideally form the predefined positional relationship with the predefined location corresponding to the pattern boundary 213 defined between the corresponding adjacent pair of the first and second mark patterns 211, 212. Therefore, the offset between the mapped location $(X_1, X_2, \ldots, X_n)$ corresponding to each of the detected pattern edges and the corresponding predefined location forms the calibration information corresponding to the image capturing unit 12.

In this embodiment, the processor 3 uses the predefined locations, a plurality of known parameters respectively related to the predefined locations, the mapped locations, and a plurality of detected parameters respectively related to the mapped locations to generate the calibration information corresponding to the image capturing unit 12.

The calibration information thus generated may be used for calibrating display of an image captured by the image capturing unit 12 on the display panel 11 of the optical imaging touch display device 1 so as to enhance the precision of coordinate determination of touch points on the display panel 11.

With reference to FIG. 4, assuming that the image capturing units 12, 13 are connected by a reference line (L), and that the image capturing unit 12 is connected to the predefined location corresponding to the pattern boundary 213 defined between each adjacent pair of the first and second mark patterns 211, 212 by a line $(L_1, L_2, \ldots, L_n)$ (not shown), the reference line (L) and each of the lines $(L_1, L_2, \ldots, L_n)$ include an angle $(\theta_1, \theta_2, \ldots, \theta_n)$ (not shown) therebetween. These angles $(\theta_1, \theta_2, \ldots, \theta_n)$ represent the known parameters related to the predefined locations. Further, assuming that the image capturing unit 12 is connected to the mapped location $(X_1, X_2, \ldots, X_n)$ corresponding to each of the detected pattern edges by a line $(L_1', L_2', \ldots, L_n')$, since the locations of the image capturing unit 12 and the calibration tool 2 are known in advanced, the processor 3 can determine the angle $(\theta_1', \theta_2', \ldots, \theta_n')$ included by the reference line (L) and each of the lines $(L_1', L_2', \ldots, L_n')$. These angles $(\theta_1', \theta_2', \ldots, \theta_n')$ represent the detected parameters related to the mapped locations. The processor 3 then generates an angular calibration function corresponding to the image capturing unit 12 based on the predefined locations, the known parameters $(\theta_1, \theta_2, \ldots, \theta_n)$, the mapped locations, and the detected parameters $(\theta_1', \theta_2', \ldots, \theta_n')$. The calibration information includes the angular calibration function.

It should be noted herein that although the angular calibration function corresponding to the image capturing unit 12 is illustrated to form the calibration information in the above example, the calibration information is not limited thereto in other embodiments of the present invention. Moreover, since the feature of the present invention does not reside in the computation of the calibration information per se, which may be conducted in multiple manners known in the pertinent art, further details of the same are omitted herein for the sake of brevity.

Figure 5:
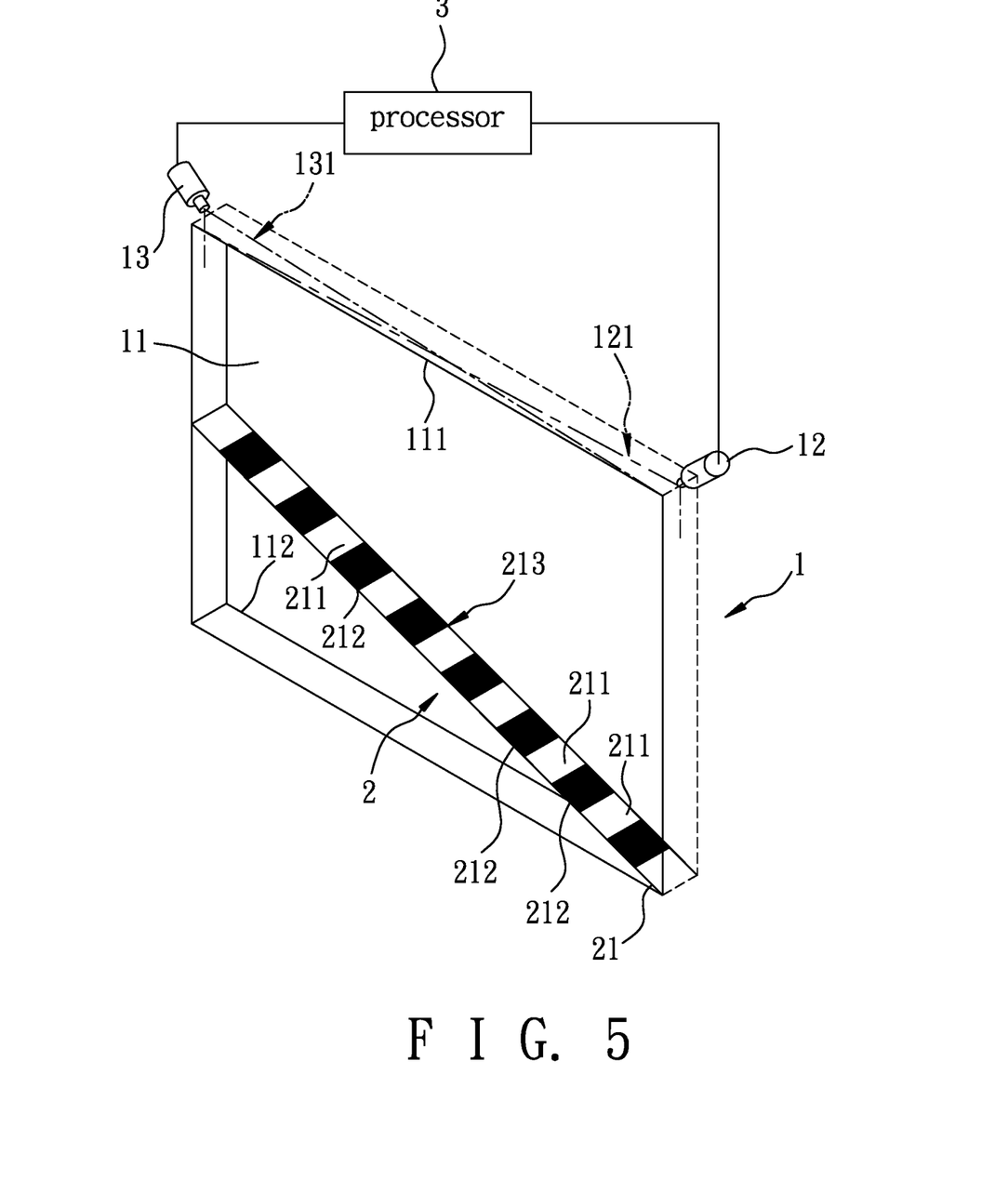
FIG. 5 is a schematic diagram, illustrating a second implementation of the embodiment of a system for generating calibration information for an optical imaging touch display device according to the present invention, where the calibration tool of the system is inclined relative to the second side of the display panel.
Figure 6:
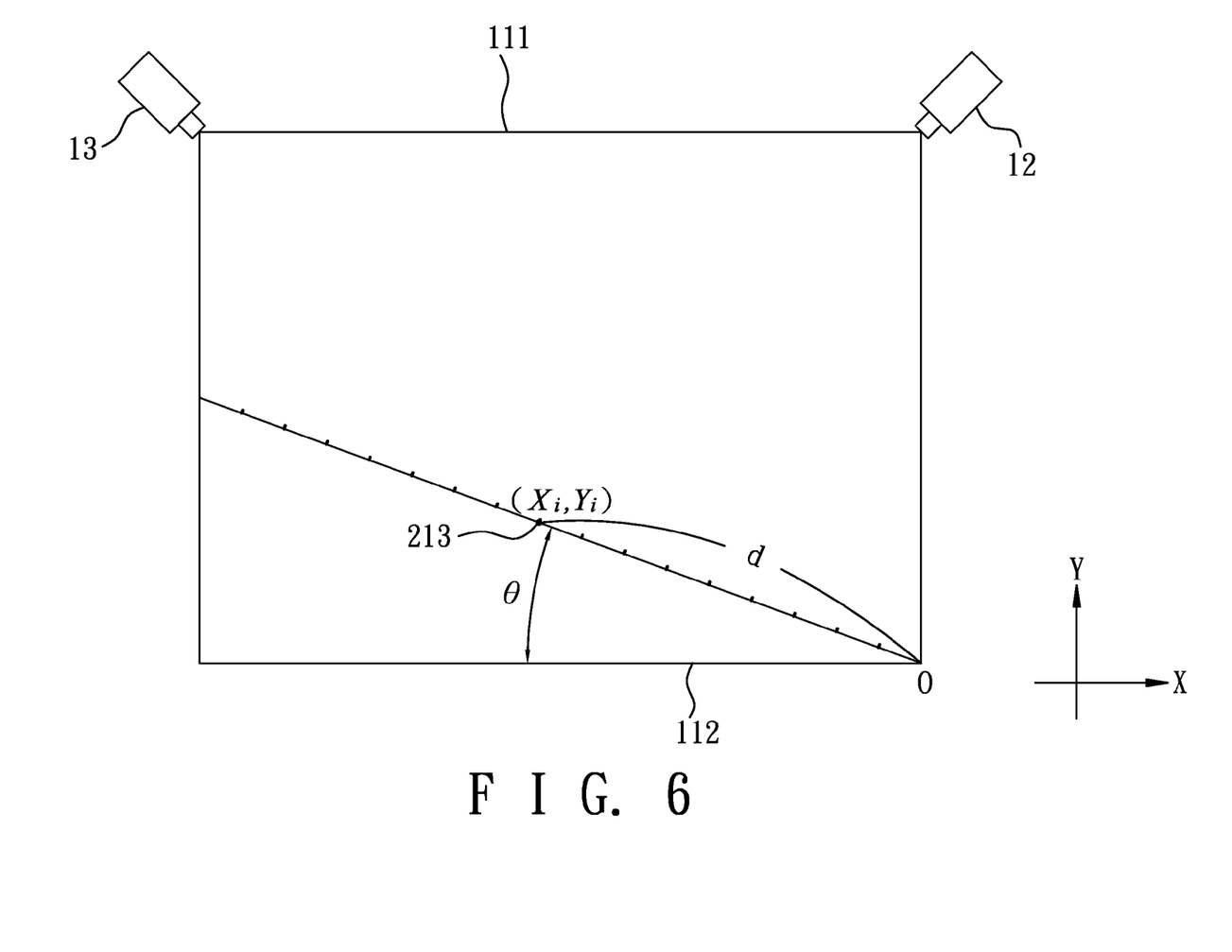
FIG. 6 is a schematic diagram, illustrating the determination of a coordinate of a pattern boundary on the calibration tool in relation to a reference point according to the second implementation of the embodiment.

Referring back to FIG. 1, in the first implementation, the calibration tool 2 is disposed on and leveled with the bottom side of the frame 14 of the optical imaging touch display device 1 adjacent to the second side 112 of the display panel 11. Alternatively, with reference to FIGS. 5 and 6, in the second implementation of the embodiment of the present invention, the calibration tool 2 is inclined relative to the bottom side of the frame 14/the second side 112 of the display panel 12 such that an angle (θ) is formed between the calibration tool 2 and the bottom side of the frame 14/the second side 112 of the display panel 12. The processor 3 then converts the position of each of said at least one detected pattern edge as determined in step 42 (specifically, sub-step 4243) into the corresponding mapped location on the optical imaging touch display device 1 with reference to the angle (θ) included by the calibration tool 2 and the bottom side of the frame 14/the second side 112 of the display panel 11. Since the distance (d) between a particular pattern boundary 213 on the surface 21 of the calibration tool 2 and a reference point (O) can be determined, with the angle (θ) predefined, the coordinate $(X_i, Y_i)$ of the particular pattern boundary 213 relative to the reference point (O) can be determined with the following formulae (5) and (6) and assist in the generation of the calibration information.

$$X_i = d \times \cos(\theta) \qquad (5)$$

$$Y_i = d \times \sin(\theta) \qquad (6)$$

In summary, with the provision of the calibration tool 2 which has a plurality of mark patterns 210 defining at least one pattern boundary 213 on a surface 21 thereof, the generation of calibration information for the optical imaging touch display device 1 does not require a user to actually perform a touch event on the display panel 11 of the optical imaging touch display device 1, and can be systematically performed using a processor 3 with the aid of an image capturing unit 12.

While the present invention has been described in connection with what is considered the most practical and embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for generating calibration information for an optical imaging touch display device that includes at least one image capturing unit by utilizing the image capturing unit, a processor and a calibration tool, the calibration tool having a surface that is provided with a plurality of mark patterns, each adjacent pair of the mark patterns defining a pattern boundary therebetween, the calibration tool being disposed such that the pattern boundary between each adjacent pair of the mark patterns forms a predefined positional relationship with a corresponding predefined location on the optical imaging touch display device, a display panel of the optical imaging touch display device having a first side and a second side spaced apart from and parallel to each other, the image capturing unit being disposed at the first side of the display panel, the calibration tool being inclined relative to the second side of the display panel, said method comprising the steps of:

(A) configuring the image capturing unit to capture an image of the surface of the calibration tool when the view of the calibration tool by the at least one image capturing unit is unobscured, so as to generate an image frame;

(B) configuring the processor to perform edge detection on the image frame so as to determine a position of each of at least one detected pattern edge within the image frame; and (C) configuring the processor to generate the calibration information with reference to the position of each of said at least one detected pattern edge as determined in step (B) and the corresponding predefined location on the optical imaging touch display device, wherein step (C) includes the sub-steps of:
- (C-1) configuring the processor to convert the position of each of said at least one detected pattern edge as determined in step (B) into a corresponding mapped location on the optical imaging touch display device; and
- (C-2) configuring the processor to generate the calibration information with reference to the mapped location corresponding to each of said at least one detected pattern edge of sub-step (C-1) and the corresponding predefined location on the optical imaging touch display device;
- wherein the corresponding mapped locations are defined in a physical coordinate system of the optical imaging touch display device, while the position of each of said at least one detected pattern edge is defined in an image coordinate system;
- wherein in sub-step (C-1), the processor converts the position of each of said at least one detected pattern edge as determined in step (B) into the corresponding mapped location on the optical imaging touch display device with reference to an angle included by the calibration tool and the second side of the display panel.

2. The method as claimed in claim 1, wherein step (B) includes the sub-steps of:
- (B-1) configuring the processor to obtain a grayscale value for each of a plurality of pixels in the image with reference to the image frame;
- (B-2) configuring the processor to determine a gradient value for each of the pixels in a predetermined direction with reference to the grayscale values obtained in sub-step (B-1), wherein the predetermined direction is related to an arrangement of the mark patterns on the surface of the calibration tool; and
- (B-3) configuring the processor to obtain, for each of the pixels of the image frame, an edge strength value by comparing the gradient value determined in sub-step (B-2) with a first threshold value; and
- (B-4) configuring the processor to determine the position of each of said at least one detected pattern edge with reference to the edge strength values of the pixels as obtained in sub-step (B-3).

3. The method as claimed in claim 2, wherein sub-step (B-4) includes the sub-steps of:
- (B-4-1) configuring the processor to perform a summation of the edge strength values of each group of the pixels that are aligned in a direction perpendicular to the predetermined direction so as to obtain a plurality of projection statistic values;
- (B-4-2) configuring the processor to determine which of the projection statistic values is greater than a second threshold value;
- (B-4-3) configuring the processor to determine the position of said at least one detected pattern edge with reference to result of determination made in sub-step (B-4-2).

4. A system for generating calibration information for an optical imaging touch display device, the optical imaging touch display device including a display panel and at least one image capturing unit, the display panel of the optical imaging touch display device having a first side and a second side spaced apart from and parallel to each other, the image capturing unit being disposed at the first side of the display panel, the system comprising:
- a calibration tool to be disposed within an image capturing range of the image capturing unit of the optical imaging touch display device, and having a surface that is provided with a plurality of mark patterns, each adjacent pair of said mark patterns defining a pattern boundary therebetween, said calibration tool being disposed such that said pattern boundary between each adjacent pair of said mark patterns forms a predefined positional relationship with a corresponding predefined location on the optical imaging touch display device, the calibration tool being inclined relative to the second side of the display panel; and
- a processor configured for receiving an image frame from the image capturing unit, the image frame corresponding to an image of said surface of said calibration tool as captured by the image capturing unit;
- wherein the image frame corresponds to an image of said surface of said calibration tool as captured by the image capturing unit when the view of the calibration tool by the at least one image capturing unit is unobscured; and
- wherein said processor performs edge detection on the image frame so as to determine a position of each of at least one detected pattern edge within the image frame, converts the position of each of said at least one detected pattern edge into a corresponding mapped location on the optical imaging touch display device with reference to an angle included by the calibration tool and the second side of the display panel, and generates the calibration information with reference to the mapped location corresponding to each of said at least one detected pattern edge and the corresponding predefined location on the optical imaging touch display device;
- wherein the corresponding mapped locations are defined in a physical coordinate system of the optical imaging touch display device, while the position of each of said at least one detected pattern edge is defined in an image coordinate system.

5. The system as claimed in claim 4, wherein said processor obtains a grayscale value for each of a plurality of pixels in the image frame received thereby from the image capturing unit, determines a gradient value for each of the pixels in a predetermined direction with reference to the grayscale values, obtains an edge strength value for each of the pixels of the image frame by comparing the gradient value with a first threshold value, and further determines the position of each of said at least one detected pattern edge with reference to the edge strength values of the pixels thus obtained, the predetermined direction being related to an arrangement of said mark patterns on said surface of said calibration tool.

6. The system as claimed in claim 4, wherein said mark patterns are arranged on said surface of said calibration tool along a predetermined direction.

7. The system as claimed in claim 6, wherein said mark patterns include at least one first mark pattern and at least one second mark pattern different in color from said first mark pattern, said first and second mark patterns being arranged alternatingly along the predetermined direction.

8. The system as claimed in claim 7, wherein said first and second mark patterns differ in color, and are respectively white and black in color.

9. The system as claimed in claim 4, wherein said processor converts the position of each of said at least one detected pattern edge into a corresponding mapped location on the optical imaging touch display device, and generates the calibration information with reference to the mapped location corresponding to each of said at least one detected pattern edge and the corresponding predefined location on the optical imaging touch display device.

* * * * *